Aug. 27, 1963 C. O. SCHMID ETAL 3,102,094
APPARATUS FOR REMOVING SETTLED SOLIDS FROM
LIQUID TREATING BASINS
Filed June 5, 1961
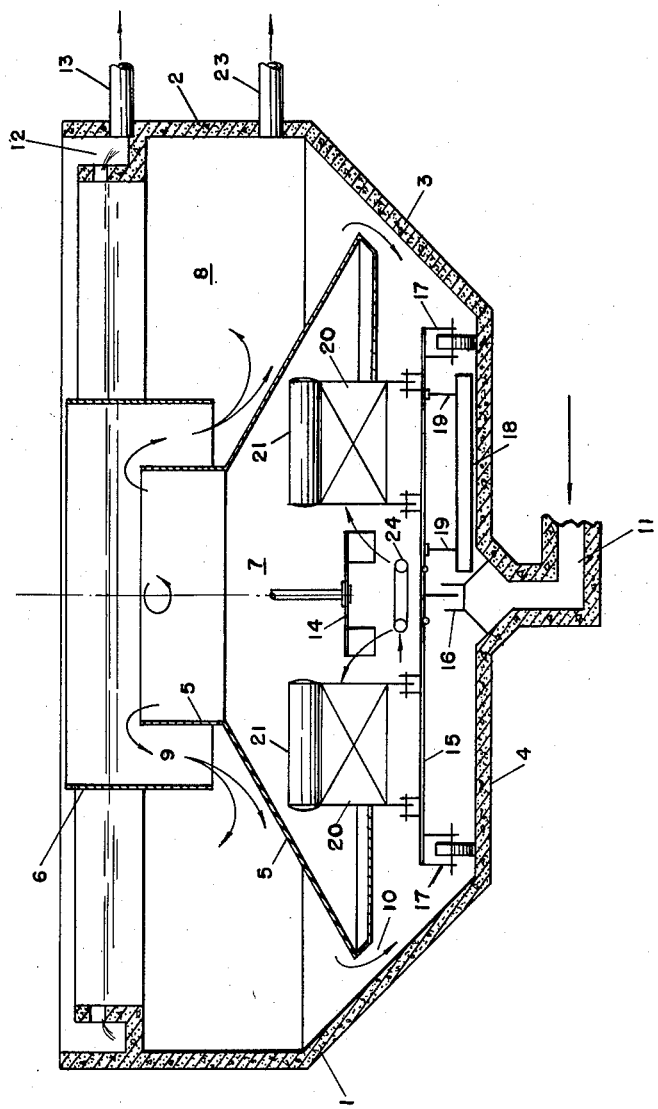

United States Patent Office 3,102,094
Patented Aug. 27, 1963

3,102,094
APPARATUS FOR REMOVING SETTLED SOLIDS FROM LIQUID TREATING BASINS
Christian O. Schmid and Artur J. Fischer, Frankfurt am Main, Germany, assignors to Infilco Incorporated, Tucson, Ariz., a corporation of Delaware
Filed June 5, 1961, Ser. No. 114,860
4 Claims. (Cl. 210—528)

This invention relates to apparatus for treating liquids containing solids of the type wherein a liquid motion that has a circumferential component in horizontal planes is maintained in the lower portion of a treating basin and solids depositing on the bottom of the basin are conveyed to a point of disposal, such as a sump or the like. More particularly the invention relates to novel and improved means for effecting the removal of solids deposited on the bottom of such a basin.

It is an object of this invention to provide in a liquid treating basin of this general type improved means for removing solids from the basin bottom to a point of disposal.

Another object is to provide novel means for driving a device for removing solids from the bottom of a liquid treating basin of the type referred to.

Another object is to provide an improved scraping device for a liquid treating basin wherein access to the bottom is difficult.

A specific object is to provide for a liquid treating basin of the type wherein sedimentation of only small amounts of solids is expected, a scraping device which is simple in construction and inexpensive in operation.

Another object is to utilize in a liquid treating basin the kinetic energy of the liquid motion in the basin to drive a scraping device.

Other objects will become apparent upon consideration of the description and claims which follow.

In many plants for the chemical or biological treatment of water or waste waters wherein solids are contained or formed during the treatment, the solids separated by sedimentation and accumulated on the bottom of the treating basin are conveyed by means of mechanical scraping mechanisms to a sump and withdrawn therefrom.

In some types of treatment plants, for example flocculation or aeration basins, or in water treatment plants where the excess solids formed during operation are withdrawn as suspension, sedimentation of solids is undesirable. The deposit of solids occurs in such basins usually at locations which are not at all or only insufficiently reached by the normal flow current in the basin.

Such deposits form on the basin floor compact layers which are difficult to remove, or, in the case of organic sludges, fermenting or putrifying sediment accumulations which disturb the purification process considerably.

Mechanical devices are known which are driven by an electric motor and collect in longitudinal or round basins deposits accumulating on the bottom and convey them to a sump, wherefrom they are withdrawn in more or less thickened form. Such devices are very expensive in construction, particularly in basins where access to the bottom is difficulty due to the partitions required in the basin. The more complicated the construction, the more it is subject to trouble. The construction cost of such devices are of particular importance when the devices are used with the above mentioned aeration and flocculation basins, where only small sludge deposits are expected, but a substantially deposit free basin bottom must be assured.

The invention relates to a device for removing deposits from, and keeping free of deposits, the bottoms of basins wherein the solids containing liquid has a motion with a circumferential component in horizontal planes about the vertical axis of the basin. The apparatus according to the invention is characterized by utilizing this liquid motion for driving a bottom cleaning device. The motion can be caused by a mechanical stirrer in the basin, by introducing air into the liquid or by introducing the liquid tangentially, or by cooperation of several or all of these measures.

The utilization of the kinetic energy of this liquid motion for driving a scraper mechanism or other bottom cleaning device is obtained by arranging in the path of the circumferential component of the liquid current one or a plurality of baffle plates radially and vertically in the basin. The baffles are centrally guided, move under the pressure of the current in the same direction about the basin axis and pull along one or a plurality of scraper blades. The scraper blades are suspended from an arm which extends radially across the bottom surface of the basin to be cleaned and is rotatably mounted in the center of the basin.

The baffle plates, which, in filled basins, may be maintained in vertical position by floats, are flexibly connected to this arm.

The invention will be more readily understood by reference to the drawing which shows for exemplification a vertical cross-sectional view through a treatment plant utilizing one embodiment of a device according to the invention.

The basin 1 has a cylindrical upper portion 2, a conical lower portion 3 and a flat bottom 4. Partitions 5 and 6 divide the basin into zones 7 and 8. These zones are in communication with each other through passageways 9 and 10. The liquid to be treated enters the inner zone 7 from below through conduit 11. The treated liquid rises in the outer zone 8 and leaves the plant through launder 12 and outlet conduit 13.

In the inner zone the entering liquid is mixed with the flocculents and a suspension of previously formed flocs by means of a pumping rotor 14. Simultaneously compressed air may be introduced into inner zone 7 through distributor 24, and be dispersed by the pumping rotor over the entire cross-sectional area of zone 7. The rising bubbles create an upflow of the liquid, whereby a vertical circulation from the inner zone 7 through passageway 9, zone 8 and passageway 10 back to the zone 7 is established. In this circulation all sludge particles and flocs should be continuously in motion. The rotor 14 creates also a liquid motion having a circumferential component about its axis, which latter coincides advantageously with the basin axis. This motion is used, according to the invention, for driving the scraper mechanism.

An arm 15 which extends radially across the bottom surface to be cleaned, is arranged spaced from the bottom and supported centrally and rotatably about the basin axis by a bearing 16 extending from the bottom of the basin. At its ends the arm 15 is supported by rollers 17 or the like against the basin bottom. From the arm 15 scraper blades 18 are flexibly suspended, so that, upon rotation of the arm 15 about the bearing 16, they are pulled over the basin bottom. In the drawing only one scraper blade is shown. In many cases one such scraper blade will be sufficient.

Also flexibly connected with arm 15 are baffle plates 20, which may, for example, comprise sheet-iron plates stiffened by frames. Floats 21, such as hollow sheet-iron drums, are connected to the upper ends of the baffle plates and maintain the baffle plates in the filled basin in vertical position. When the basin is being drained, the floats sink with the liquid surface, and the baffles turn so that they lie finally flat on the bottom of the empty basin. The floats 21 are preferably so dimensioned as to substantially compensate by their buoyancy the weight of the parts connected thereto, i.e. baffle plates 20, arm 15 and blades 18, so that friction between the rollers 17 and the bottom of the tank is minimized. While two baffle plates are shown in the drawing for purposes of illustration, only one plate or a greater number can be used for driving the arm 15.

On the side exposed to the pressure of the liquid motion the baffle plates can be fitted with guide vanes. These utilize the flow components imparted by the pumping rotor even better, and if air is introduced into zone 7, they effect an additional breaking up and finer dispersion of the air bubbles.

In operation of the mechanism, the baffle plates with the floats are rotated by the liquid motion caused by the pumping rotor and pull along the arm 15 and the scraper blades depending therefrom.

In order to fully utilize this motion, the baffle plates can be arranged at a suitable angle to the arm 15 and to the basin axis. Similarly, the scraper blades 18 can be positioned at such an angle to the arm 15 that they move the solids accumulated on the basin bottom toward the center or the periphery of the basin. Ordinarily the first mentioned position is used, in order to be able to collect the solids in, and withdraw them from, a central sump.

If the apparatus according to the drawing is used as flocculation basin with a subsequent clarification basin, then sedimentation in the flocculation basin must be prevented. Small quantities of deposits can be moved by the scraper blades to the basin periphery, so that they are picked up by the circulation returning through passageway 10 to the inner zone 7; or they can be conveyed to the center of the basin where they are incorporated in the flow pattern prevailing in the basin by the liquid entering through inlet conduit 11.

The apparatus according to the drawing can also be used as flocculation and clarification plant with slurry recirculation, the clarified water separating dynamically upwardly from the suspension which flows downwardly in outer zone 8, and leaving the basin through launder 12, while the excess solids formed during the process are withdrawn through a lateral solids outlet conduit 23 as a suspension, or in thickened condition from a sludge pocket, not shown. In this case the solid particles separating due to heavy weight from the circulating suspension and accumulating on the basin bottom will be scraped to a sump located in the center of the basin.

These two examples show particularly distinctly the advantages of the invention. In a flocculation basin with subsequent clarification basin or in a combined flocculation and clarification basin with slurry recirculation the sludge scraper has the task of keeping the basin bottom free of deposits. Since in both cases sedimentation is not desired, the quantities of solids to be removed from the bottom are relatively small and do not justify use of the known large and heavy scraper devices with separate electric drive. Furthermore, use of such scrapers would be difficult in these cases due to the partitions mounted in the basin.

We claim:

1. In an apparatus for the treatment of liquids containing solids, including a basin having a bottom and an upstanding wall, and means in said basin causing a liquid motion having a circumferential component in horizontal planes about the basin axis in the lower portion of said basin, an improved device for removing from the bottom of said basin deposited solids which are not removed by the kinetic energy of said liquid motion, said device comprising support means supported from said bottom in said lower portion and rotatable about the axis of said basin, a baffle plate mounted on said support means and extending upwardly therefrom in the path of, and subjected to, the kinetic energy of said liquid motion to rotate said support means about said axis, and means suspended from said support means for removing solids from said bottom to a point of disposal, said means for removing solids extending partly across and in proximity to said basin bottom.

2. In an apparatus for the treatment of liquids containing solids, including a basin and means causing a liquid motion having a circumferential component in horizontal planes about the basin axis in the lower portion of said basin, improved means for scraping from the bottom of said basin deposited solids which are not removed by the kinetic energy of said liquid motion, said means comprising an arm extending across said lower portion, said arm being supported from the bottom of said basin so as to be rotatable about the axis of said basin, a plurality of baffle plates pivotably mounted on said arm in the path of, and subjected to the kinetic energy of said liquid motion to rotate said arm about said axis, a float secured to the upper edge of each baffle plate, and a scraper blade pivotably suspended from said arm and extending parallel and in proximity to said bottom of said basin.

3. In an apparatus for the treatment of liquids containing solids, including a basin and means causing a liquid motion having a circumferential component in horizontal planes about the basin axis in the lower portion of the basin, an improved device for keeping the bottom of said basin free of deposits, said device comprising an arm extending across said lower portion, a centrally arranged bearing and a pair of peripheral wheels supporting said arm from said bottom so as to be rotatable about the axis of said basin, at least one scraper blade pivotably suspended from said arm and extending parallel and in proximity to said bottom of said basin and at an angle to said arm to convey deposits to a collecting sump, and means for rotating said arm, said means comprising a plurality of baffle plates pivotably mounted on said arm and extending upwardly therefrom in the path of said liquid motion, said plates being arranged at an angle to said arm conducive to subjecting said plates to the full kinetic energy of said liquid motion, and a float affixed to the upper edge of each baffle plate.

4. In an apparatus for the treatment of liquids containing solids, including a basin and means causing a liquid motion having a circumferential component in horizontal planes about the basin axis in the lower portion of the basin, improved means for keeping the bottom of said basin substantially free of deposited solids, said means comprising support means mounted in said lower portion and rotatable about the axis of said basin, a baffle plate mounted on said support means in the path of, and subjected to the kinetic energy of said liquid motion to rotate said support means about said basin axis, float means affixed to the upper edge of said baffle plate, and maintaining said plate in vertical position in the liquid filled basin, and a scraper blade suspended from said support means and extending parallel and in proximity to said basin bottom, said float means being so dimensioned as to substantially compensate by its buoyancy the weight of the parts connected thereto.

References Cited in the file of this patent

UNITED STATES PATENTS

| Re. 20,761 | Pruss | June 14, 1938 |
| 192,313 | Watson | June 19, 1877 |
| 2,886,175 | Kalinske | May 12, 1959 |